United States Patent [19]

Doshier

[11] Patent Number: 4,930,572

[45] Date of Patent: Jun. 5, 1990

[54] HEAT PIPE AND AQUA-THAW ANIMAL WATERER

[76] Inventor: John R. Doshier, 232 Montclair, Tulsa, Okla. 74104

[21] Appl. No.: 244,716

[22] Filed: Sep. 14, 1988

[51] Int. Cl.$^5$ .......................... F28D 15/02; A01K 7/00
[52] U.S. Cl. .......................................... 165/45; 119/73;
165/104.21; 165/177; 165/179
[58] Field of Search ...................... 165/45, 104.21, 184,
165/177, 179; 119/73

[56] References Cited

U.S. PATENT DOCUMENTS

| | | | |
|---|---|---|---|
| 4,162,684 | 7/1979 | Loveless, Jr. ......................... | 119/73 |
| 4,320,720 | 3/1982 | Streed ............................... | 165/104.21 |
| 4,793,146 | 12/1988 | Ryokai ................................ | 165/45 |
| 4,836,275 | 6/1989 | Sakaya ................................ | 165/45 |

Primary Examiner—Albert W. Davis, Jr.
Attorney, Agent, or Firm—Head & Johnson

[57] ABSTRACT

In accordance with the present invention there is provided an animal watering device comprising an insulated reservoir and a heat tube capable of extending from a point in the earth below the frost line upwardly into the container and thereby transferring the heat of the earth into the water in the reservoir as a result of a suitable working fluid contained in the heat tube. Also there is provided a heat tube having a twisted wall and a wound section in the reservoir.

8 Claims, 2 Drawing Sheets

HEAT PIPE AND AQUA-THAW ANIMAL WATERER

FIELD OF INVENTION

The present invention relates to heat pipes, i.e. those sealed tubes capable of transferring heat from one location to another as a result of the vaporization and condensation of a working fluid contained in the sealed tube. In another aspect the present invention relates to a water containment vessel capable of inhibiting the freezing of water without the use of gas, electricity, or non-renewable fossil fuels.

BACKGROUND OF THE INVENTION

The watering of livestock, pets, zoo animals, and the like when the ambient temperature is below the freezing point of water has been known for years to pose aggravating problems. Various approaches have been taken for trying to insure that fresh unfrozen water is constantly available to animals during such temperature conditions. Generally in the past the most common practice has been to provide heat to the container to prevent the freezing of the water therein. Typically this has been done through the use of resistive electrical current heating, or through the use of fossil fuel burning heaters which may be emersed within the water. The costs involved in the use of electricity and fossil fuel heaters have often discouraged the use of such devices. In addition, such devices generally require fairly constant monitoring to make sure that there has been no interruption in the energy supply which would prevent the operation of the heater.

Some years ago an attempt was made to develop an animal watering device which could use the heat of the earth to prevent the freezing of the water. The device is disclosed in U.S. Pat. No. 4,320,720, the disclosure of which is incorporated herein by reference. The geothermal watering device of that patent involved the use of components that had to be specifically designed for the apparatus. For example, the device of that patent employs a chamber 8 which surrounds the lower end of the water reservoir 18. Two tubes 10 and 12 are employed for cycling a working fluid from beneath the frost line to the chamber and back to a point beneath the earth. These specially designed components would obviously increase the production costs of the device both from the standpoint of the materials required and the expertise required for the assembly of the components.

An object of the present invention is to provide a means for heating a water supply for animals without the use of fossil fuels. Another object of the present invention is to provide a means for supplying liquid water to animals regardless of the ambient atmospheric temperature surrounding the supply of water.

Still another object of the present invention is to provide an improved type of heat tube or heat pipe. Still yet another object is to provide a geothermally heated animal watering device which is easily assembled and which is constructed of relatively inexpensive components.

Other aspect, objects and advantages of the present invention will be apparent from the following description taken in connection with the accompanying drawings.

SUMMARY OF THE INVENTION

In accordance with the present invention there is provided an animal watering device comprising an insulated reservoir capable of retaining a selected volume of water, a heat tube having first and second sealed ends, wherein the first end extends into the reservoir for direct contact with the water present in said reservoir and wherein the second end is adapted to extend into the earth below the frost-line, and a volatile working fluid contained in said heat tube, said working fluid comprising of material being capable of being vaporized by the heat of the earth beneath the frost-line and of being condensed in the upper end of the heat tube so that the heat of vaporization can be transferred by indirect heat exchange into the water in said insulated reservoir. Further, in accordance with the present invention there is provided a novel heat pipe comprising a length of twisted tubing having spiral convolutions on both the inside and the outside throughout the substantial portion of the length thereof.

DETAILED DESCRIPTION OF A PREFERRED EMBODIMENT

Figure 1:
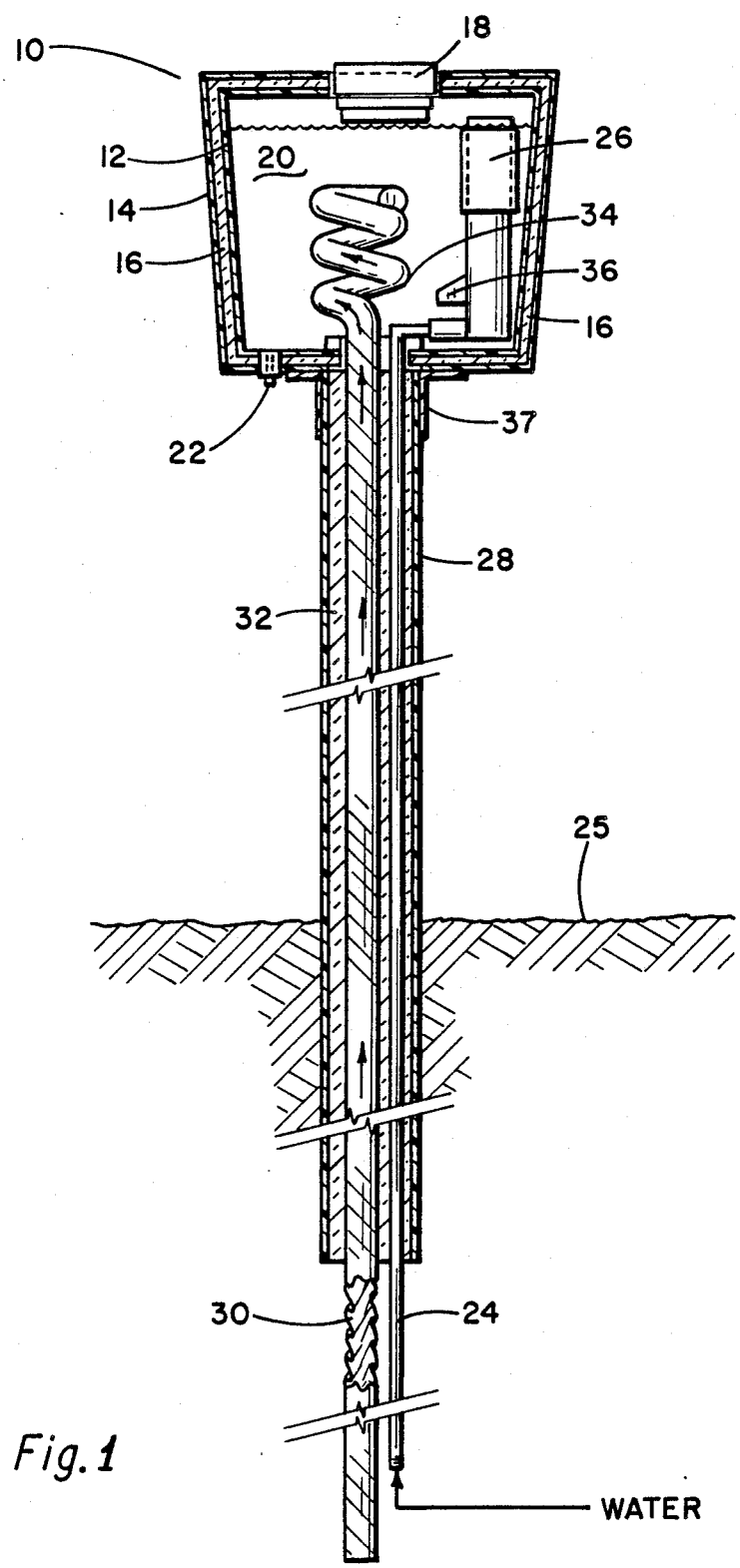
FIG. 1 is a cross-sectional view of an animal watering device constituting one embodiment of the present invention.
Figure 2:
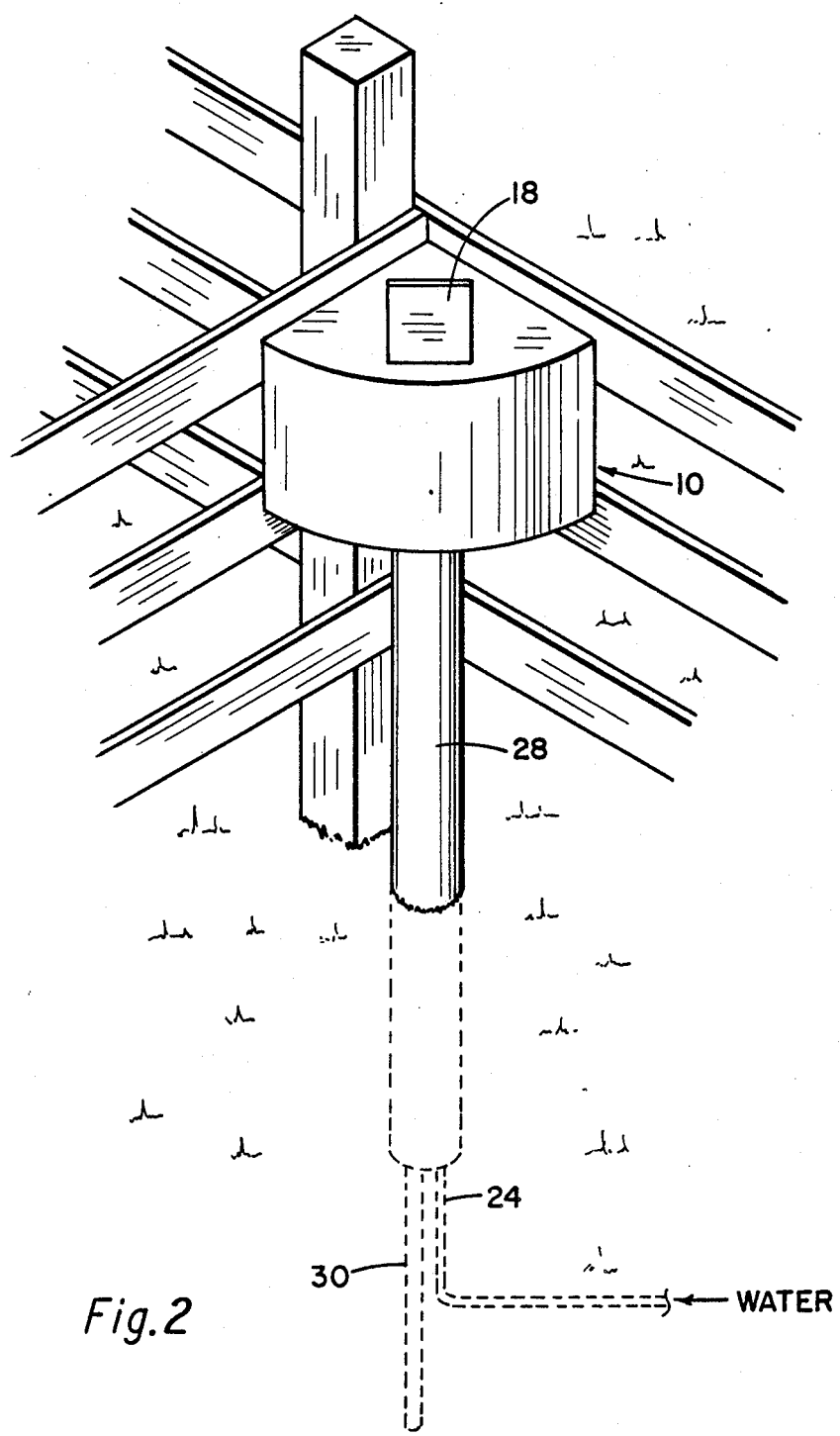
FIG. 2 is a perspective view of an inventive watering device of the type shown in FIG. 1 installed in a corner situation.

A preferred embodiment of the present invention is illustrated in FIGS. 1 and 2 which show a typical inventive animal watering device installed in the earth. The illustrated inventive watering device comprises an insulated water container 10. The water container preferably comprises an inner tank wall 12 and an outer tank wall 14, both constructed of polyethylene, ABS rubber or other suitable polymeric material. Preferably, the inner tank wall is white or lightly colored and the outer tank wall is black or darkly colored. The dark outer wall is useful for absorbing and retaining heat and the light inner wall is useful in maintaining a sanitary vessel for the water.

The inner and outer tank walls are separated by a layer of suitable insulation, such as polyurethane foam, polystyrene, or the like. The particular insulation employed and the thickness thereof can be varied depending upon the temperature conditions to which the container will be exposed.

The water container 10 has an insulated lid 18 covering the opening through which an animal can obtain access to the water 20 within the container. Preferably, the insulated lid 18 is adapted to float on the surface of the water while being capable of being moved downwardly to allow an animal to obtain access to the water 20. In an alternative embodiment the lid could be an insulated lid which the animal lifts in order to obtain access to the water.

In a currently preferred embodiment the floating lid 18 is hinged to the top of the container. Obviously, other means than hinges could be employed to insure that the lid will remain in the access opening while still allowing for an animal to drink from the device.

Along the lower surface of the container 10 there is provided a drain plug 22 which allows one to drain the water from the device for cleaning or maintenance.

The particular volume of the container 10 can vary and the optimum volume is generally determined by considering the capacity of the heating device to be designed and the lowest ambient temperatures to which the device will generally be exposed. A volume of about three gallons is generally sufficient for animals such as horses or cows.

One of the advantages of the embodiment illustrated in the attached figures is that there is no need for a container of particularly large volume. In the illustrated embodiment, water is supplied to the container 10 via a water line 24 which connects to a source of supply located in the earth 25 beneath the frost line. The water line extends upwardly into the container and is connected to a float valve assembly 26 which only allows water to flow into the container when the water level has dropped below a selected level.

A water line 24 passes upwardly through a protective housing comprising a pipe 28 constructed of polyvinyl chloride or some other suitable impact resistant material. The pipe 28 is preferably buried in the earth to a point below the normal frost line.

The heat tube 30 is located within the pipe 28. The heat tube extends from a point within the earth below the frost line upwardly into the container. The pipe 28 is filled with insulation 32 such as polyurethane foam, polystyrene, or the like to insulate the heat pipe 30 and the water pipe 24 from the surrounding earth, particularly in those areas above the earth and in those areas above the frost line. The insulation also separates and insulates the water pipe 24 from the heat tube 30.

In the illustrated embodiment the heat tube 30 comprises a length of twisted tubing having each end sealed. Twisted tubing has been used in the past in various applications. An example of twisted tubing and a process for its manufacture are disclosed in U.S. Pat. No. 4,437,329, the disclosure of which is incorporated herein by reference. The currently preferred tubing is a twisted tubing sold under the trade name Delta Twist by Delta t. Limited of Tulsa, Oklahoma. A preferred type of this tubing would have an outside diameter of a range of about ⅝ to about ¾ inch. This twisted tubing has spiral convolutions on both the inside and the outside throughout a substantial portion of the length thereof. These convolutions are illustrated in a partial cross-sectional view of the tubing shown in FIG. 1.

In the illustrated embodiment the upper end of the twisted tubing comprises a section in which the twisted tubing has been wound in the form of a helix to provide an additional heat exchange surface zone 34. The helix is formed about the central axis of the longitudinal main portion of the heat tube. The width of the helix can be varied as desired. Preferably at least some parallel portions of the tubing of the helix section are spaced apart from each other as illustrated so as to provide increased heat exchanged surface area.

The sealed heat tube 30 contains a working fluid comprising a material capable of being vaporized by the heat of the earth beneath the frost line and of being condensed in the upper end of the heat tube so that the heat of vaporization can be transferred to the water 20 by indirect heat transfer. The movement of the fluid upwardly in the tube 30 is illustrated by arrows in FIG. 1. Any suitable working fluid could be employed. Typically working fluids include those chloroflorohydrocarbon containing compositions and the like often currently used in refrigeration applications. Such materials are often sold under the trade name Freon. The currently preferred dichlorofluoromethane working fluid is one sold as R-22 refrigerant fluid. Another example is the R-12 refrigerant fluid. The optimum amount of working fluid employed can be determined by routine experimentation.

As illustrated in FIG. 1 it is currently preferred for the outlet 36 of the float valve assembly 26 to be located below the normal water level of the water in the container 10. Most preferably, the outlet is located in a lower section of the container proximate to the heat exchange surface zone 34 of the heat tube 30. This arrangement has been found to result in improved mixing and warming of the water within the container 10.

The installation of the watering device of the type illustrated in FIG. 1 is quite simple and can be readily achieved using a post hole digger. In most locations within the United States depending upon the depth of the frost line, the heat tube would extend approximately four feet below the earth surface. According one merely needs to dig a hole about four to five inches in diameter and about four feet deep, generally making provision for connection to a water source. After inserting the protective pipe housing 28 in the hole, simple plumbing connections can be made to connect the water line 24 to the source of water. The hole would then be back-filled and the device would be ready for operation. The device is preferably installed in the corner of a stall or corral so as to afford maximum support and protection from damage. According the container 10 preferably has dimensions adapted to fit within a typical corner arrangement as shown in FIG. 2.

In a currently preferred embodiment the protective housing 28 is polyvinyl chloride pipe and the outer wall of the container is polyethylene. The pipe 28 fits within a downwardly depending polyethylene flange 37. The container flange 36 and the pipe 28 can be bounded together using a suitable adhesive or melt welding.

The openings in the container 10 through which the heat tube 30 and the water line 24 pass can be sealed using gaskets or bushings as known in the art. It is also possible to employ a melted polymer weld or suitable caulking compound in order to obtain a water type seal.

In a typical device the insulated housing is about 54 inches long. About 30 inches of the housing 28 is installed above the ground and about two feet of heat pipe extends below the housing for contact with the heat of the ground. Further, a typical helix portion on the upper end of the heat pipe 30 would extend about six inches above the bottom of the container 10. The helix section would typically have a width of about four to six inches and would include about three to six quarter turns.

While the present invention has now been described in some detail in regard to a preferred embodiment, it should be clear that many variations and modifications can be made without departing from the spirit and scope of the present invention. The inventive watering devices can readily be adapted so as to be suitable for a wide variety of animals, including cows, dog, pigs, chickens, turkeys, sheep, cats, and wild birds. The inventive heat tube can be employed in generally any application where heat tubes have been employed in the past.

What is claimed is:

1. An animal watering device comprising:
   an insulated reservoir capable of retaining a selected volume of water;

a heat tube comprising a length of tubing having an upper and a lower sealed end wherein the upper end extends into the reservoir for direct contact with the water present in the reservoir and wherein the lower end extends into and contacts the earth below the frost line;

a volatile working fluid contained in said heat tube, the working fluid comprising a material capable of being vaporized by the heat of the earth beneath the frost line and capable of being condensed in the upper end of the heat tube and wherein the portion of said heat tube adjacent said upper end is folded in overlapping relationship within said reservoir for improved transfer of heat from said tube to the water in said reservoir.

2. An animal watering device according to claim 1 in which the portion of said heat tube adjacent said upper end is wound in the form of a helix within said reservoir.

3. An animal watering device according to claim 2 in which said heat pipe portion adjacent said upper end is wound in the form of a helix about the central axis of the longitudinal main portion of said heat tube.

4. A device according to claim 1 including means for supplying water to said reservoir comprising a water line which extends from a point in the earth beneath the frost line to a point within the reservoir.

5. A device according to claim 1 wherein said heat tube is insulated from the point where said heat tube exits the reservoir to a point at least to the normal frost line.

6. A device according to claim 1 wherein the heating tube is surrounded by insulation to a point below the normal frost line.

7. A device according to claim 1 wherein the water line and the heat tube are insulated from the earth and from each other at all points above the normal frost line.

8. A device according to claim 1 wherein said heat tube comprises a length of twisted tubing having both on the inside and outside convolutions spiraling throughout a substantial portion of the length thereof.

* * * * *